US007650489B2

(12) United States Patent
Coulson

(10) Patent No.: US 7,650,489 B2
(45) Date of Patent: Jan. 19, 2010

(54) DETERMINING COHERENCY BETWEEN A NON-VOLATILE MEMORY AND A SYSTEM

(75) Inventor: Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 11/387,355

(22) Filed: Mar. 23, 2006

(65) Prior Publication Data

US 2007/0226479 A1 Sep. 27, 2007

(51) Int. Cl.
*G06F 15/177* (2006.01)
(52) U.S. Cl. ............................ 713/1; 713/2; 713/100
(58) Field of Classification Search ............... 713/1, 713/2, 100
See application file for complete search history.

(56) References Cited

U.S. PATENT DOCUMENTS

| | | | | |
|---|---|---|---|---|
| 6,263,348 B1* | 7/2001 | Kathrow et al. | ............... | 707/203 |
| 6,378,037 B1* | 4/2002 | Hall | ............... | 711/113 |
| 7,219,261 B2* | 5/2007 | Tada et al. | ............... | 714/15 |
| 7,392,374 B2* | 6/2008 | Chandramouleeswaran et al. | ............... | 713/100 |
| 2003/0089675 A1* | 5/2003 | Koestler | ............... | 213/201 |
| 2005/0125606 A1 | 6/2005 | Garney | ............... | 711/113 |
| 2005/0138282 A1 | 6/2005 | Garney et al. | ............... | 711/113 |
| 2005/0166200 A1* | 7/2005 | Willis, II | ............... | 717/173 |
| 2006/0059327 A1* | 3/2006 | Brown et al. | ............... | 713/1 |
| 2006/0146589 A1* | 7/2006 | Karlsson et al. | ............... | 365/145 |

OTHER PUBLICATIONS

U.S. Appl. No. 11/394,364, filed Mar. 30, 2006, entitled "Maintaining Write Ordering in a System" by Richard L. Coulson; Sanjeev N. Trika; Jeanna N. Matthews; Robert W. Faber.
U.S. Appl. No. 11/254,508, filed Oct. 20, 2005, entitled "A Method to Enable Fast Disk Caching and Efficient Operations on Solid State Disks" by Sanjeev N. Trika et al.
U.S. Appl. No. 11/317,779, filed Dec. 23, 2005, entitled "Cache Disassociation Detection" by Knut S. Grimsrud.
U.S. Appl. No. 11/172,051, filed Jun. 29, 2005, entitled "A Method, Device, and System to Avoid Flushing the Contents of a Cache by Not Inserting Data From Large Requests" by Jeanna N. Matthews.
U.S. Appl. No. 11/172,608, filed Jun. 30, 2005, entitled "Technique to Write to a Non-Volatile Memory" by Sanjeev N. Trika et al.

* cited by examiner

*Primary Examiner*—Tse Chen
(74) *Attorney, Agent, or Firm*—Trop, Pruner & Hu, P.C.

(57) ABSTRACT

In one embodiment, the present invention includes a method for reading an identifier stored in a non-volatile memory, where the identifier is associated with an operating system that caused storage of the identifier, determining if the identifier matches a comparison value provided by a current operating system of a system to which the non-volatile memory is coupled, and resetting the non-volatile memory if the identifier and the comparison value do not match. Other embodiments are described and claimed.

8 Claims, 5 Drawing Sheets

DETERMINING COHERENCY BETWEEN A NON-VOLATILE MEMORY AND A SYSTEM

BACKGROUND

Embodiments of the present invention relate to a non-volatile storage device, and more particularly to use of the non-volatile storage device in a system.

As computer systems continue to evolve with greater processing capabilities, a major bottleneck to improved system performance is the delay or latency associated with accessing requested information from a memory hierarchy. Latencies can be particularly high if information needs to be accessed from a mass storage device. Accordingly, various proposals exist for improving or increasing intermediate a between a processor and a mass storage device. For example, static random access memory (SRAM) is often closely coupled with a processor to act as a cache memory to store frequently requested information that can be rapidly accessed by the processor. Further, it has been proposed to reduce latencies by incorporating a so-called disk cache between a disk drive mass storage device and a processor so that read and write data may be provided to and from the processor via the intermediary disk cache.

It is anticipated that future systems and operating systems (OSs) for use in these systems may seek to reduce both latencies and delays associated with paging information in and out from memory. To this end, devices such as expanded or extended memory devices (EMDs), which may be external memory devices, may be coupled to a system to provide storage to act as an extended physical memory, allowing more virtual memory pages to be located in a lower than disk latency memory, thus reducing delays. Because such an external expanded memory device may be removed from one system and placed into another, upon powering down of the first system, the contents of the EMD will be flushed in order to ensure that no changes have been made that would corrupt the contents. Accordingly, even if the EMD is not removed from the system, on a next power up of the system, the EMD will not include any valid data. Thus the delays associated with accessing information from a mass storage device must occur until the EMD is filled, which may take many minutes, impacting performance.

DETAILED DESCRIPTION

Figure 1:
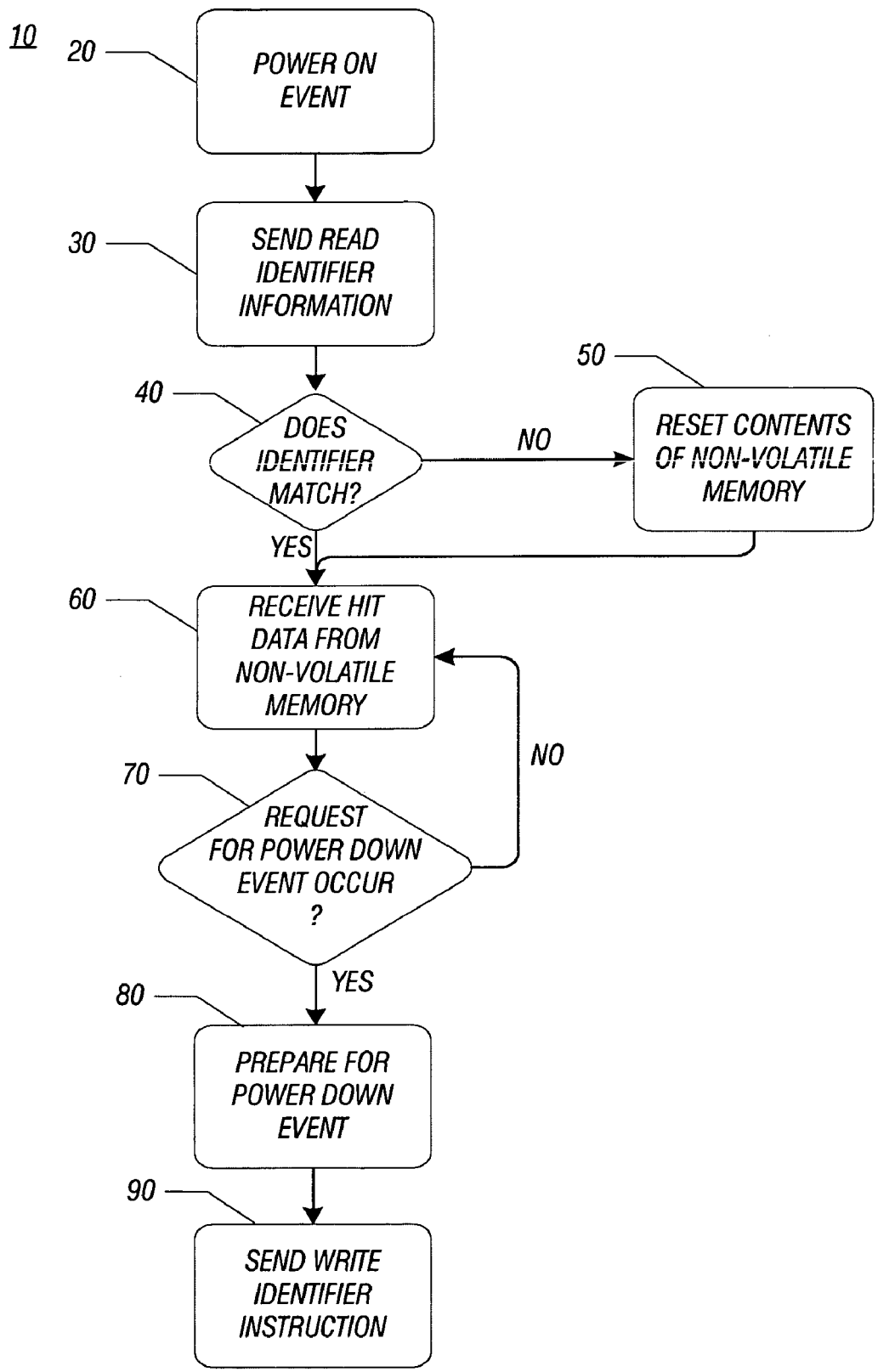
FIG. 1 is a flow diagram of a method in accordance with one embodiment of the present invention.

In various embodiments, an identifier may be written to a predetermined location in a non-volatile memory. This identifier may be written by an operating system (OS) to indicate that the OS was the last entity to write data to the non-volatile memory. The non-volatile memory may be an internal memory device or an external memory device. Such a device may be a solid-state disk (SSD), a disk cache, an extended virtual memory or other storage device.

In operation, an OS may write its identifier, which may be a unique identifier associated with a given instantiation of an OS, to the non-volatile memory during a system shutdown process. Then when the system is powered back up, the OS may access the identifier stored in the non-volatile memory and compare it to the OS's own identifier. If the indicators match, this means that the non-volatile memory has remained coherent with the system (and the non-volatile memory has not been removed from the system and used in a different system), where the indicator of the non-volatile memory is automatically cleared when a first write occurs to the device. Accordingly, the data in the non-volatile memory may be maintained and read requests made by the OS may be fulfilled using data in the non-volatile memory immediately upon the power up event. In contrast, if the indicators do not match on comparison, this indicates that the non-volatile memory was removed and used in a different system. Because data corruption would occur, the non-volatile memory may be cleared prior to its use back in the original system.

Because embodiments of the present invention allow the OS to know for certain that the contents of the non-volatile memory may be trusted, the OS may now maintain data stored in a non-volatile memory after a suspend, hibernate or shutdown operation rather than clearing it, and therefore performance upon power up (e.g., after boot, resume or the like) may be improved, as requested data may be obtained immediately from the non-volatile memory.

In some embodiments, a non-volatile memory may receive particular commands to write and read the identifier associated with an OS. In one embodiment, a write_identifier command may be received from an OS and used to store a corresponding identifier value in the predetermined location in the non-volatile memory. Similarly, in one embodiment a read_identifier command may be received from an OS and, responsive thereto, the non-volatile memory may access the identifier stored in the predetermined location and provide it back to the OS for comparison purposes. Of course, other commands may be used in different embodiments. For example, normal read and write commands may be used.

Accordingly, an OS may rapidly determine whether any writes have occurred to a non-volatile memory while the non-volatile memory was not under control of the OS. If the non-volatile memory was last written to by the OS, the benefits of the non-volatile memory may be immediately available after power up of the system. Furthermore, embodiments may reduce power consumption, as a disk drive or other mass storage device can avoid filling the non-volatile memory with data upon a power up if the non-volatile memory and the disk drive are coherent (i.e., the non-volatile memory has not been used outside of the system since a last power up of the system).

Referring now to FIG. 1, shown is a flow diagram of a method in accordance with one embodiment of the present invention. FIG. 1 shows a method that may be performed by an operating system (OS) to determine whether a non-volatile memory associated with a mass storage device has been separated from the mass storage device. In other embodiments, instead of an OS other software, such as a driver or controller associated with the non-volatile memory or the mass storage device may perform the method.

As shown in FIG. 1, method 10 may begin upon a power on event of a system (block 20). In different embodiments, a power on event may correspond to a booting of a system, resuming from a low-power mode, or another transfer of control to the OS. When the power on process has reached a certain stage, e.g., identification of available devices and other power on activities, control passes to block 30. There a read identifier instruction may be sent to the non-volatile memory (block 30). In response to this instruction, the non-volatile memory may access an identifier stored in a predetermined location of the non-volatile memory. For example, a particular location in an array of the non-volatile memory may be configured to store an identifier. In response to the read identifier instruction, the non-volatile memory may to send this identifier to the OS.

Still referring to FIG. 1, next it may be determined whether the identifier sent from the non-volatile memory matches an identifier associated with the OS (diamond 40). If the identifiers do not match, this is an indication that the non-volatile memory has been separated from and used outside of the system including the OS. Accordingly, control passes from diamond 40 to block 50. There, the contents of the non-volatile memory may be reset (block 50). That is, because the non-volatile memory has been separated from the system, it cannot be guaranteed that the contents are coherent with data in the system. Accordingly, to prevent accessing of corrupted data, the non-volatile memory is reset. In various embodiments, different manners of resetting the non-volatile memory may be realized. For example, all locations in the non-volatile memory may be erased. Alternately, the locations may be invalidated, or another such manner of resetting the contents of a non-volatile memory may be realized.

Still referring to FIG. 1, if instead at diamond 40 is determined that the identifiers match, control passes to block 60. There, normal system operation may proceed. That is, when read requests are sent from the OS that correspond to data present in the non-volatile memory, the non-volatile memory may provide the hit data to the OS (block 60). Accordingly, the benefits of having the non-volatile memory, e.g., that acts as an extended virtual memory, disk cache or other high-speed memory, may be realized. Note that block 60 is also performed after the reset of the non-volatile memory in block 50. However, the benefits of having immediate access to data in the non-volatile memory are not realized, and requested data is first obtained from a mass storage device and then stored in the non-volatile memory.

From block 60, control passes to diamond 70. There it may be determined whether a request for a power down event has occurred (diamond 70). That is, the OS may determine whether it needs to enter a power down state, such as powering off, hibernating, suspending operation, shutting down or a similar such state. If not, control passes from diamond 70 to block 60, discussed above for continued normal operation.

If instead at diamond 70 it is determined that a request for a power down event has been received, control passes to block 80. There, the OS may prepare the system for the power down event (block 80). Accordingly, various activities to prepare the system for the power down event may be performed, such as resetting to a known state, flushing data back to a mass storage device or other such activities. When the system is ready for the power down state, a final instruction may be sent from the OS to the non-volatile memory.

Specifically, as shown in FIG. 1 the OS may send a write identifier instruction to the non-volatile memory to write an identifier associated with the OS to the identification location in the non-volatile memory (block 90). Accordingly on a next power up of the system, this value may be accessed to determine whether the array has been separated from the system. While described with this particular implementation in this embodiment, it is to be understood that the scope of the present invention is not so limited and other manners of determining whether a non-volatile memory has been disassociated with a system may be realized.

Figure 2:
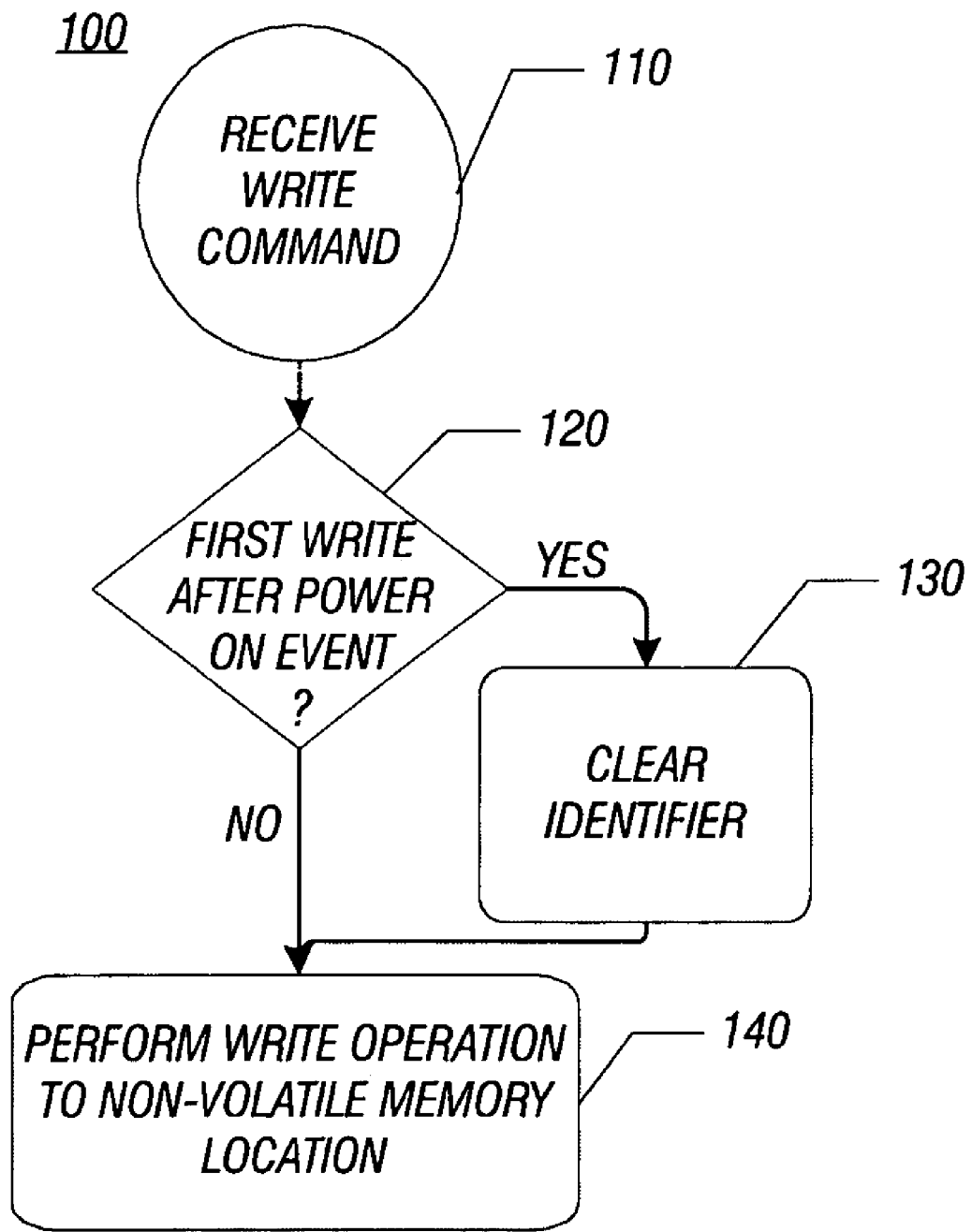
FIG. 2 is a flow diagram of a method in accordance with another embodiment of the present invention.

Referring now to FIG. 2, shown is a flow diagram of a method in accordance with one embodiment of the present invention. More specifically, method 100 of FIG. 2 may be used to clear the identifier previously stored in the non-volatile memory. As shown in FIG. 2, method 100 may begin by receiving a write command (block 110). This write command may be received from the OS and may correspond to a normal write command to write data to the non-volatile memory. Next, the non-volatile memory may determine whether this write command is the first write command received after a power on event (diamond 120). If so, control passes to block 130. There, the identifier previously stored in the identifier location may be cleared (block 130). By clearing the identifier, the non-volatile memory may be prepared to receive a new value for the identifier when a write identifier is received during a next power down event, and to ensure the identifier is cleared if the non-volatile memory is written by another when the system is in a low power state. From both of diamond 120 and block 130, control passes to block 140. At block 140, the write operation may be performed by writing the requested data to a selected location of the non-volatile memory.

Figure 3:
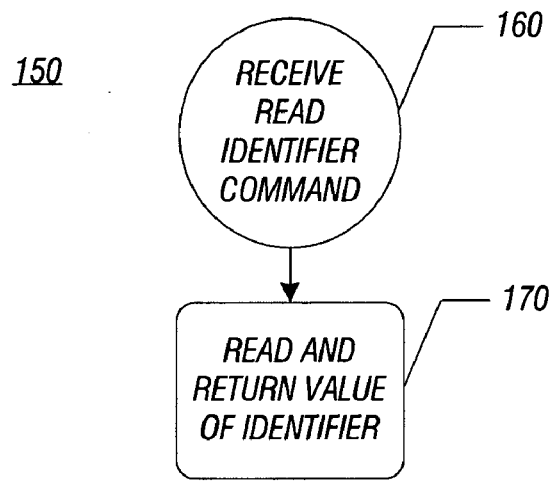
FIG. 3 is a flow diagram of a method for performing a read identification operation in accordance with one embodiment of the present invention.

Referring now to FIG. 3, shown is a flow diagram of a method for performing a read identification operation in accordance with one embodiment of the present invention. As shown in FIG. 3, method 150 may begin by receiving a read identifier command, e.g., from the OS (block 160). Upon receipt of the command, which may be received by the non-volatile memory during a power up of a system, the non-volatile memory reads and returns the value of the identifier stored in the identifier location to the OS (block 170). Accordingly, the OS can then compare this value to its own identification value to determine whether the non-volatile memory was last written to in a different system.

Figure 4:
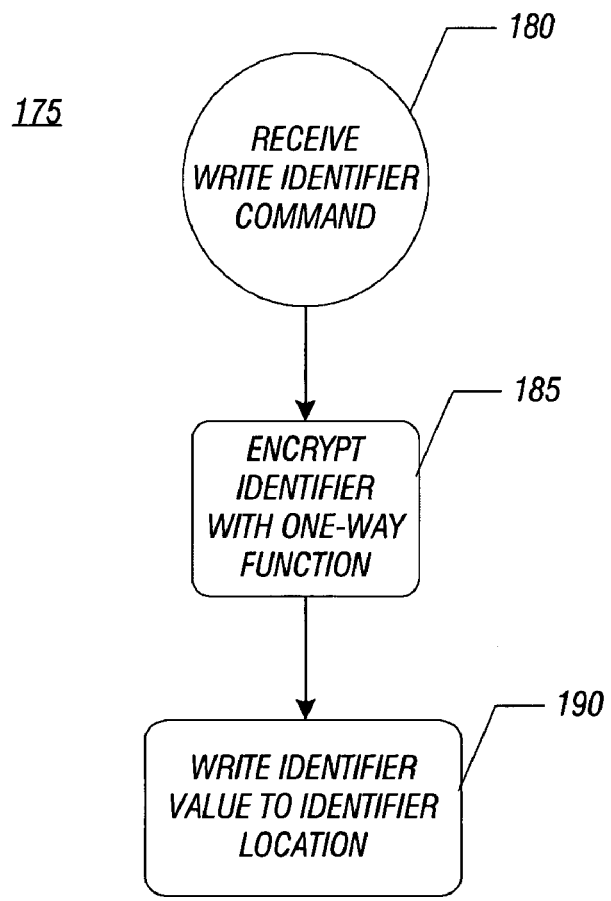
FIG. 4 is a flow diagram of a method for performing a write identification operation in accordance with one embodiment of the present invention.

Referring now to FIG. 4, shown is a flow diagram of a method for performing a write identification operation in accordance with one embodiment of the present invention. As shown in FIG. 4, method 175 may begin by receiving a write identifier command, e.g., from the OS (block 180). This command may be received during a power down event, and in various embodiments may be the last instruction sent by the OS to the non-volatile memory prior to system power down. Upon receipt of this instruction, the non-volatile memory may encrypt the identifier received with the instruction using a one-way function (block 185). However, it is to be understood the scope of the present invention is not limited this regard and in various embodiments the identifier may be stored without encryption or via a different encryption form. However, by encrypting the identifier, particularly with a one-way function, improved security may be provided, as an unauthorized user may not be able to determine the original value of the identifier code after encryption (and therefore cannot replace it using the write identifier command). Still referring to FIG. 4, from block 185 control passes to block 190. There the write identifier value may be written to the identifier location (block 190). Accordingly, the identifier value may be present when requested upon a next start up of a system including the non-volatile memory.

While the embodiments of FIGS. 1-4 are discussed in the context of an identification value, is to be understood that the scope of the present invention is not limited in this regard and in other implementations a flag-type system may be used to indicate whether a non-volatile memory has been separated from a system.

Figure 5:
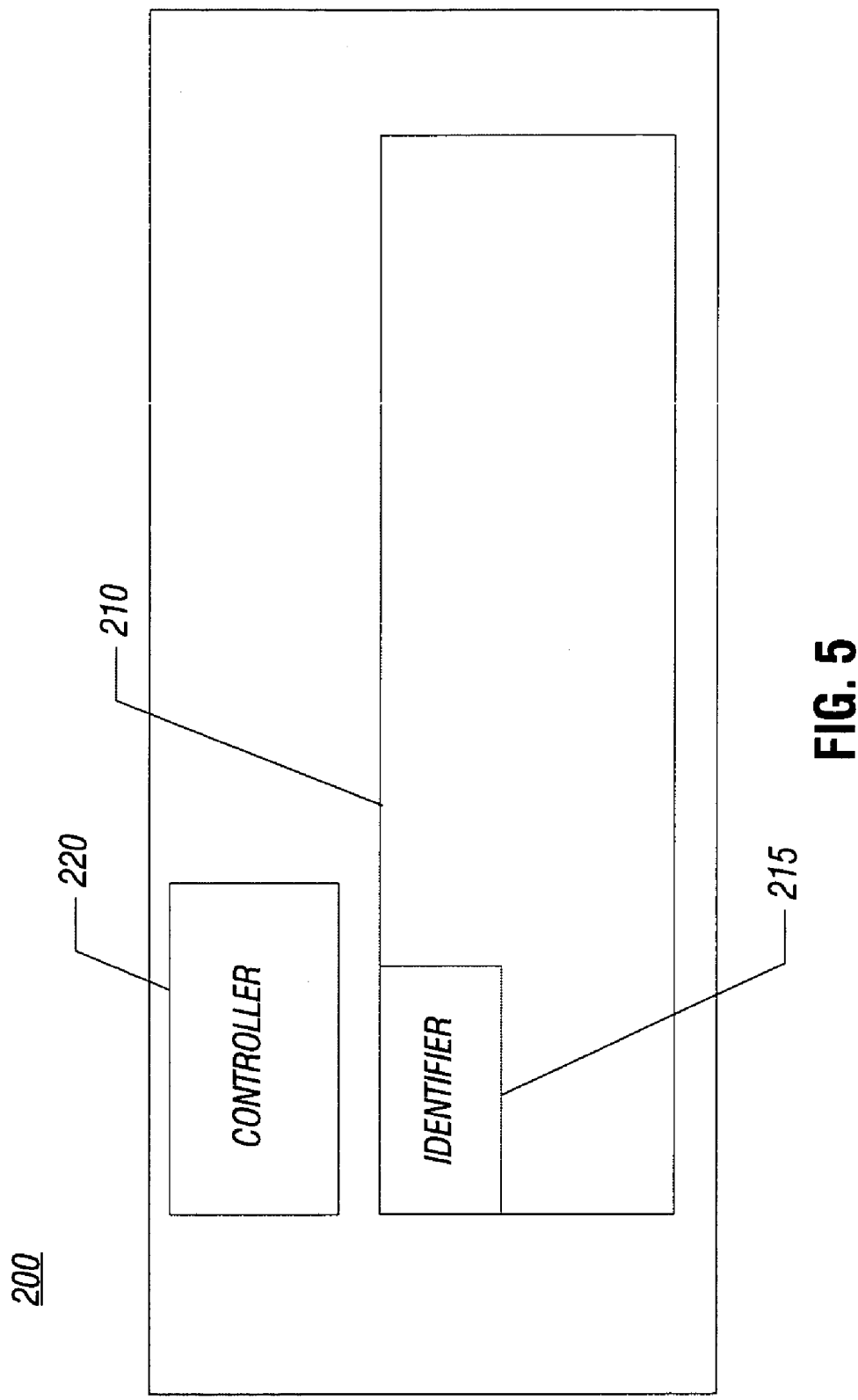
FIG. 5 is a block diagram of a non-volatile memory in accordance with one embodiment of the present invention.

Referring now to FIG. 5, shown is a block diagram of a non-volatile memory in accordance with one embodiment of the present invention. As shown in FIG. 5, non-volatile memory 200 may include a memory array 210 that includes storage for various data. Furthermore, volatile memory array 210 may include an identifier location 215 that may be a dedicated location to store an identifier received from an OS. Also present in non-volatile memory 200 may be a controller 220 that can be used to perform embodiments of the present invention. Specifically, controller 220 may be used to read and write the identifier value to identifier location 215. Furthermore, controller 220 may be used to implement various activities, such as resetting memory array 210 when it is placed in a different system than it has been previously used (or returned to an original system), to avoid data corruption issues. Of course, controller 220 may perform other activities with respect to non-volatile memory 200. Furthermore, while described as a controller, it is to be understood that a controller may take the form of various hardware, software (such as a driver), firmware or combinations thereof, in different embodiments.

Figure 6:
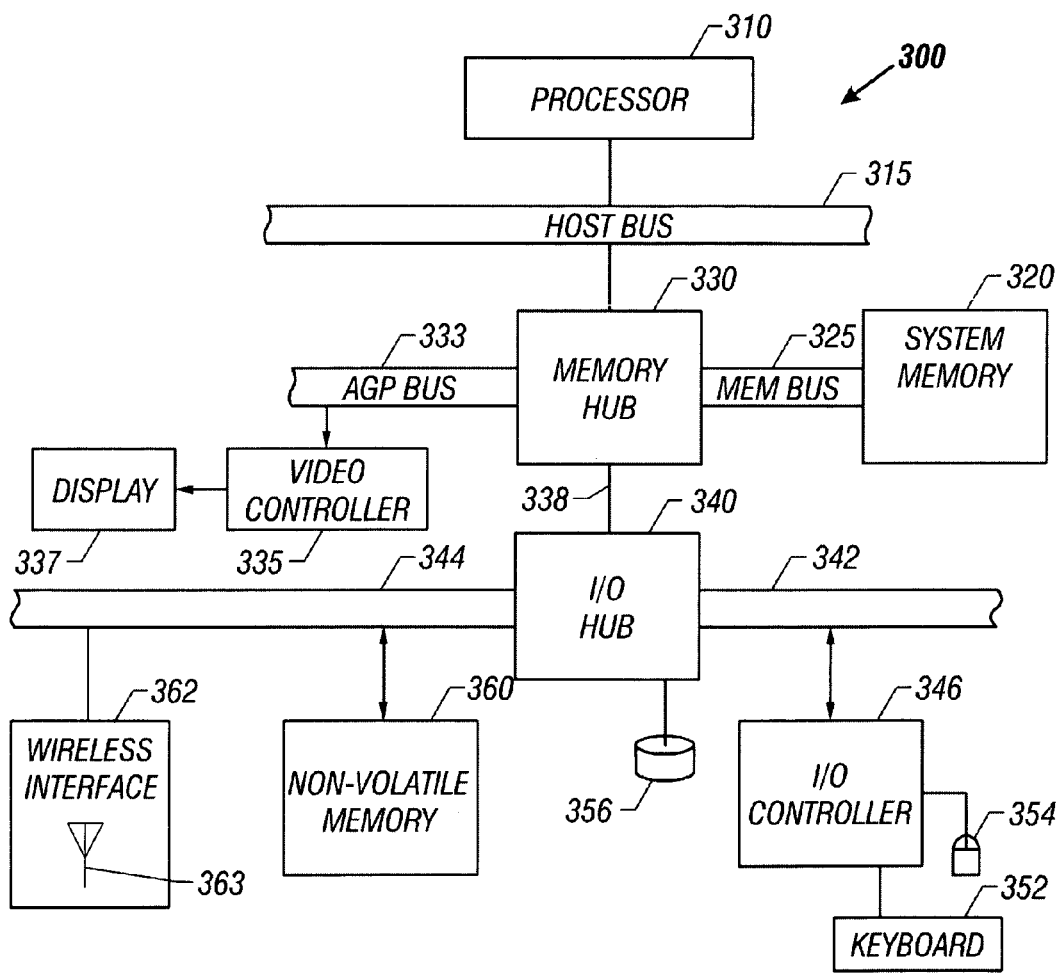
FIG. 6 is a block diagram of a system with which embodiments of the present invention may be used.

FIG. 6 is a block diagram of an exemplary processor-based system with which embodiments of the invention may be used. System 300 includes a processor 310, which may be a general-purpose or special-purpose processor. Processor 310 may be realized as a microprocessor, microcontroller, an application-specific integrated circuit (ASIC), a programmable gate array (PGA), and the like. As used herein, the term "system" may be any type of processor-based system, such as a mainframe computer, a desktop computer, a server computer, a laptop computer, a portable device, an appliance, a set-top box, or the like.

In one embodiment, processor 310 may be coupled over a host bus 315 to a memory hub 330, which, in turn, may be coupled to a system memory 320, which may be a dynamic random access memory (DRAM) in one embodiment, via a memory bus 325. Memory hub 330 may also be coupled over an Advanced Graphics Port (AGP) bus 333 to a video controller 335, which may be coupled to a display 337. AGP bus 333 may conform to the Accelerated Graphics Port Interface Specification, Revision 2.0, published May 4, 1998, by Intel Corporation, Santa Clara, Calif.

Memory hub 330 may also be coupled (via a hub link 338) to an input/output (I/O) hub 340 that is coupled to a first bus 342 and to a second bus 344. First bus 342 may be coupled to an I/O controller 346 that controls access to one or more I/O devices. As shown in FIG. 3, these devices may include in one embodiment input devices, such as a keyboard 352 and a mouse 354. I/O hub 340 may also be coupled to, for example, a hard disk drive 356. It is to be understood that other storage media may also be included in system 300.

Second bus 344 may also be coupled to various components including, for example, a non-volatile memory 360 that in some embodiments, may take the form of an internal or external memory device as described herein. Accordingly, non-volatile memory 360 may act as a disk cache for disk drive 356, or may be an extended virtual memory with respect to system memory 320. In other embodiments, non-volatile memory 360 may act as a solid-state disk to store data (and may take the place of disk drive 356, in some embodiments). Of course, additional devices may be coupled to first bus 342 and to second bus 344.

For example, shown in FIG. 6 is a wireless interface 362 coupled to second bus 344. Wireless interface 362 may be used in certain embodiments to communicate with remote devices. As shown in FIG. 6, wireless interface 362 may include a dipole or other antenna 363 (along with other components not shown in FIG. 6). Although the description makes reference to specific components of system 300, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a non-volatile memory including an identification storage to store an identifier indicative of a last operating system to write data to the non-volatile memory, the identifier corresponding to a unique identifier associated with a given instantiation of the operating system, the identifier written to the identification storage during a power down process; and
a controller to compare the identifier to a value received from a current operating system, wherein the identifier and the comparison value not matching is an indication that the non-volatile memory was separated from the system and used in a different computer system.

2. The apparatus of claim 1, wherein the current operating system is to clear the non-volatile memory if the identifier and the value do not match.

3. The apparatus of claim 1, wherein the controller is to reset the identifier in the identification storage when a first write command after a power up event is received by the non-volatile memory.

4. The apparatus of claim 3, wherein the controller is to write the identifier to the identification storage during the power down process, the identifier received from the current operating system.

5. The apparatus of claim 1, wherein the controller is to provide data to the current operating system from the non-volatile memory upon entry to the current operating system after a power up event if the identifier and the value match, and otherwise to clear the non-volatile memory.

6. The apparatus of claim 1, wherein the non-volatile memory is to act as a virtual memory cache of the system, wherein the non-volatile memory is removable from the system.

7. An apparatus comprising:
a non-volatile memory to act as a solid state disk for a computer system and including:
a memory away including an identification storage at a dedicated location to store an identifier indicative of a last operating system to write data to the non-volatile memory, the identifier corresponding to a unique identifier associated with a given instantiation of the operating system, the identifier written to the identification storage during a power down process; and a controller to compare the identifier to a value received from a current operating system, reset the identifier in the identification storage when a first write command after a power up event is received by the non-volatile memory, provide data to the current operating system from the non-volatile memory upon entry to the current operating system after the power up event if the identifier and the value match, which indicates that the non-volatile memory was not separated from the computer system and used outside of the computer system after the power down process, and if the identifier and the value do not match, which indicates that the non-volatile memory was separated from the computer system and used outside of the computer system after the power down process, to clear the non-volatile memory.

8. The apparatus of claim 7, wherein the non-volatile memory is to provide the identifier to the controller responsive to a read identifier command from the current operating system.

* * * * *